Nov. 2, 1954 O. VON ZELEWSKY 2,693,365
DRIVER FOR LATHES
Filed March 15, 1952 3 Sheets-Sheet 1

INVENTOR
Ottomar von Zelewsky
BY
Richard Geier
ATTORNEYS

Nov. 2, 1954     O. VON ZELEWSKY     2,693,365
DRIVER FOR LATHES
Filed March 15, 1952     3 Sheets-Sheet 2
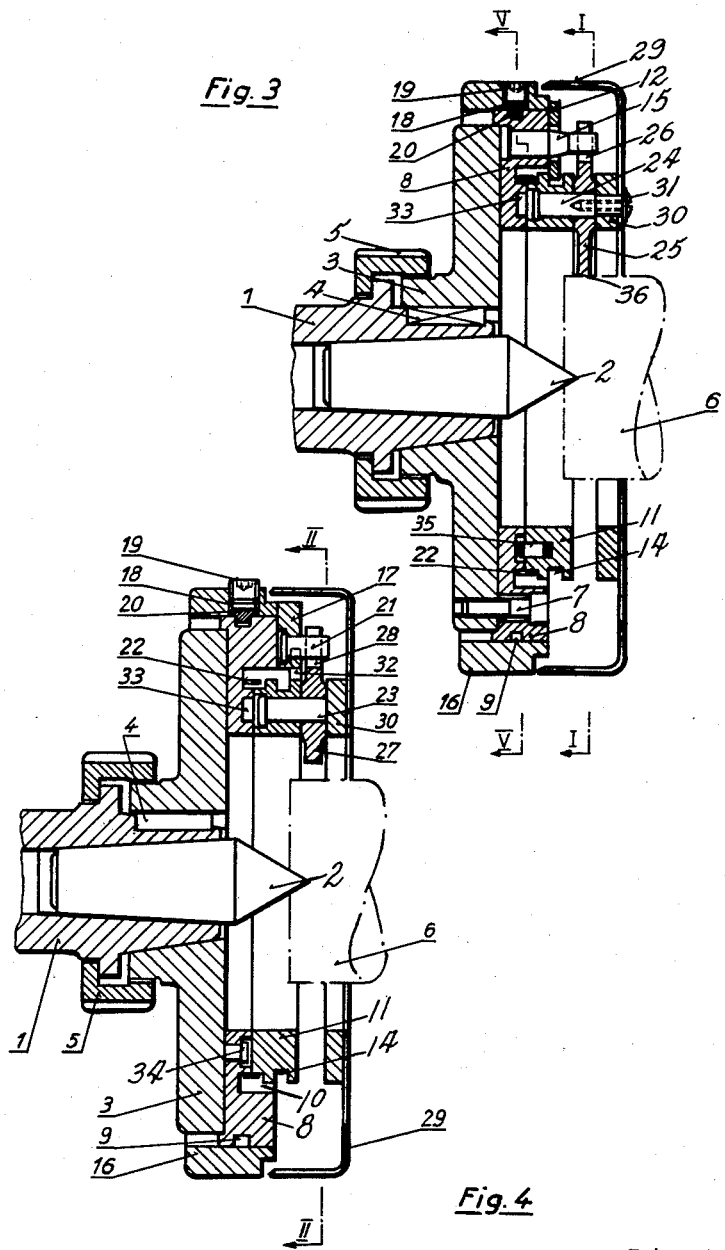
INVENTOR
Ottomar von Zelewsky
ATTORNEYS Nov. 2, 1954     O. VON ZELEWSKY     2,693,365
DRIVER FOR LATHES Filed March 15, 1952     3 Sheets-Sheet 3

INVENTOR
Ottomar von Zelewsky
BY
ATTORNEYS

United States Patent Office 2,693,365
Patented Nov. 2, 1954

2,693,365

DRIVER FOR LATHES

Ottomar von Zelewsky, Neuhausen am Rheinfall, Switzerland, assignor to Georg Fischer Aktiengesellschaft, Schaffhausen, Switzerland, a Swiss company Application March 15, 1952, Serial No. 276,729

1 Claim. (Cl. 279—106)

The present invention relates to a driver for lathes with at least two clamping cams oscillatably mounted on a floating ring, said cams being in engagement with driver pins arranged on a fixed flange ring, whereby the floating ring is adapted to be twisted in the flange ring and the clamping cams are brought into the clamping position by twisting the floating ring opposite to the direction of rotation.

In the known constructions of drivers of this nature, it is possible for the clamping cams to be released from the workpiece during braking and stopping of the lathe spindle, when the clamping diameters and the weights of the workpieces are large, due to the centrifugal forces which are set up, whereby the workpiece can continue to rotate and damage the fixed centre.

According to the present invention, after the clamping cams have been brought into the clamping position by twisting the floating ring, at least two counter cams, which are oscillatably mounted on the floating ring and are in engagement with driver pins arranged on a clamping ring rotatable on the fixed flange ring, are brought into the clamping position by twisting the clamping ring and secure the latter in this position on the fixed flange ring.

One embodiment of the invention is shown by way of example in the accompanying drawings, wherein:

Fig. 3 is a cross-section through the driver, taken on the line III—III of Fig. 1; the clamping cams and the counter cams are in the driving position;

Fig. 4 is a cross-section through the driver, taken on the line IV—IV of Fig. 2; the clamping cams and the counter cams are in the untensioned position;

Figure 1:
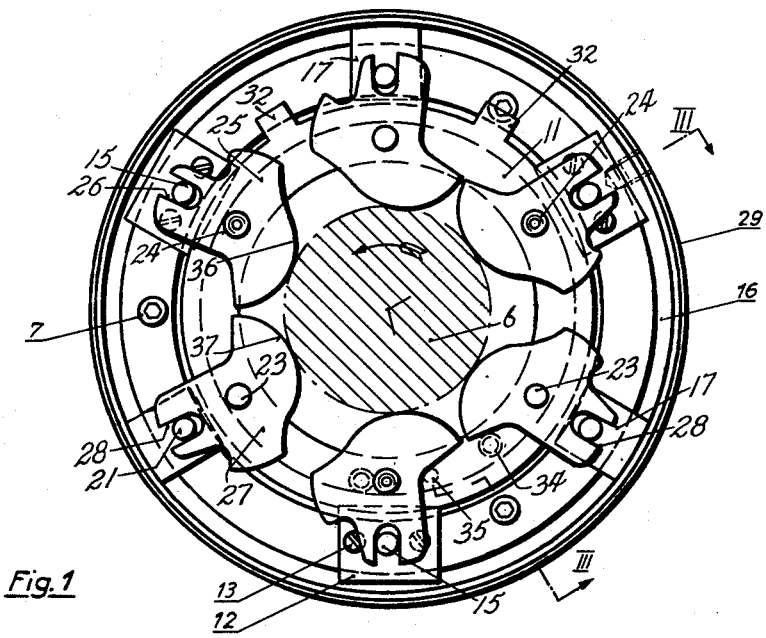
Fig. 1 is an end view of the driver, but with the casing cut away, the view being taken on the line I—I of Fig. 3; the clamping cams and the counter cams are shown in the driving position.

The drawings show the front end 1 of a machine tool spindle for example, a lathe spindle, having a fixed centre 2. In the embodiment illustrated, there is seated on the conical end of the spindle 1 a flange 3 which is prevented from rotating by a key 4 and is held axially by a threaded ring 5. A workpiece 6, which is only shown by way of indication, is to be held between a centre 2 and the centre of a tail stock (not shown).

Secured to the flange 3 by means, for example, of three screws 7 is a flange ring 8 having a peripheral groove 9. A floating ring 11 is arranged in a side recess 10 of the flange ring 8 so as to be freely rotatable and easily adjustable in the radial direction. Uniformly distributed at the periphery of the flange ring 8 are, for example, three guide members 12, each of which is fixed by two screws 13 and engages with slight clearance in a peripheral groove 14 of the floating ring 11 so as to secure the latter axially.

Secured with uniform spacing on the front side of the flange ring 8 are three driver pins 15. A retaining ring 16 with, for example, three lugs 17, is arranged to be readily rotatable on the flange ring 8. For axially securing the retaining ring 16 on the flange ring 8, there is provided a fitted block 20 which is adapted to be secured by a set screw 19 in a screw thread 18 and thus acts as the clamping element for the retaining ring 16 on the flange ring 8.

Secured in each of the three lugs 17 of the retaining ring 16 is a pin 21. The floating ring 11 is elastically centered in the side recess 10 of the flange ring 8 by, for example, three leaf springs 22. Three pivot pins 23 and three pivot pins 24 are mounted in the floating ring 11, the pins of each set being uniformly spaced from one another at the periphery. Oscillatably mounted on each of the three pivot pins 24 is a clamping cam 25, the driving pins 15 of the flange ring 8 engaging in slots 26 of the clamping cams 25. Oscillatably mounted on each of the three pivot pins 23 is a counter cam 27, the pins 21 in the lugs 17 of the retaining ring 16 engaging in slots 28 of the counter cams 27.

A casing 29 with which is rigidly connected a reinforcing ring 30 is in screw threaded engagement with the three pivot pins 24 in the floating ring 11 by means of three screws 31, the clamping cams 25 nevertheless being capable of oscillating on the pivot pins 23.

The clamping faces 36 of the clamping cams 25 and the clamping faces 37 of the counter cams 26 are made approximately according to a logarithmic spiral and they may expediently be made toothed or milled, the said faces 36 contacting the workpiece 6.

Arranged on the floating ring 11 are two cams 32 which, when the floating ring 11 is twisted with respect to the retaining ring 16, can abut against the lugs 17 of the latter.

Disposed in a front annular groove 33 of the flange ring 8 are two stop pins 34, and in the floating ring 11 there is a pin 35 which projects into the annular groove 33 and can abut against the two stop pins 34 disposed therein.

Figure 2:
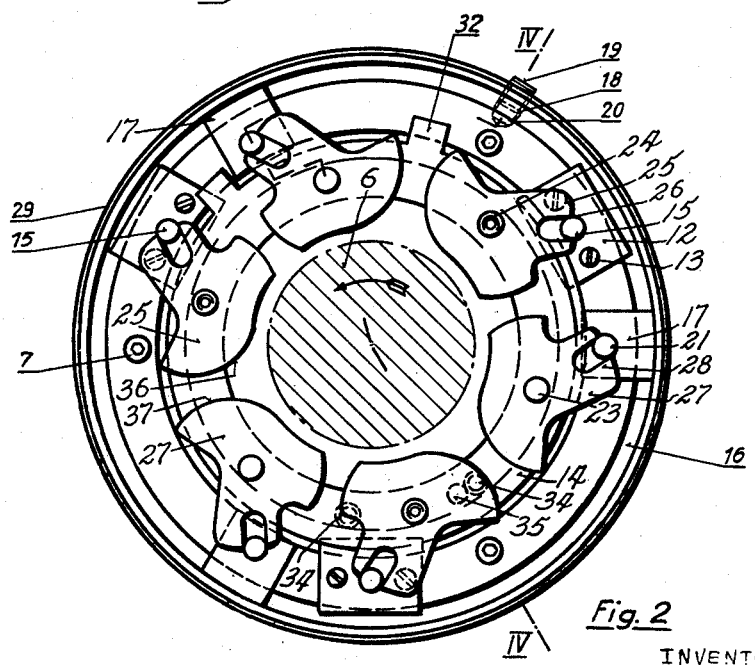
Fig. 2 is an end view of the driver as in Fig. 1, but on the line II—II of Fig. 4, the clamping cams and the counter cams are shown in the released or untensioned position.
Figure 5:
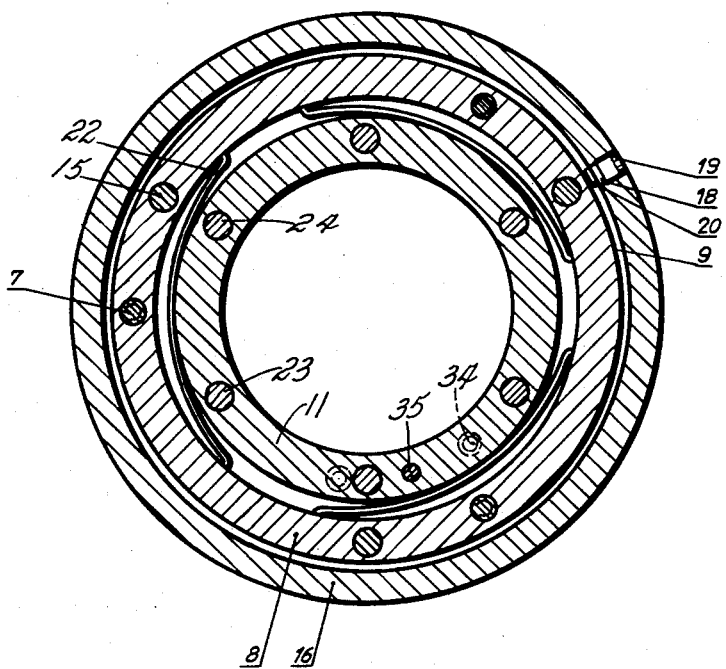
Fig. 5 is a section on the line V—V of Fig. 3.

The operation of the driver according to the embodiment illustrated in Figs. 1 to 5 is as follows:

Due to the action of the three leaf springs 22, the floating ring 11 is elastically centered in the flange ring 8 and, in the untensioned or released position of the driver, the set screw 19 is released.

If a workpiece 6, which has to be secured between two lathe centres, is to be driven by the driver in the direction of rotation indicated by the arrow, then the clamping cams 25 and the counter cams 27 have to be brought into engagement with the workpiece 6. In the untensioned position of the driver (Figs. 2 and 4), the casing 29 is first of all turned as far as possible in the direction opposite to the direction of rotation. Consequently, through the screws 31 and the pivot pins 24 in the floating ring 11, the three clamping cams 25 are swung about the driver pins 15 which are located in the flange ring 8 and which can slide in slots 26 until the clamping faces 36 of the clamping cams 25 bear on the periphery of the workpiece 6.

Then the retaining ring 16, the set screw 19 of which is released, is also swung opposite to the direction of rotation. By this means, the three counter cams 27 are swung about the pivot pins 23 in the floating ring 11 by the pins 21 in the lugs 17 of the retaining ring 16 until the clamping faces 37 of the counter cams 27 bear on the periphery of the workpiece 6; in this movement, the pins 21 can slide in the slots 28 of the counter cams 27. Finally, by tightening the set screw 19 over the fitted block 20, the clamping ring 16 is held against turning movement on the flange ring 8. It is now possible to operate with the driver.

In the stopping of the working spindle 1 of the lathe, the inertia of the workpiece 6 will cause the clamping faces 36 of the three clamping cams 25 to be lifted from the workpiece 6 during the braking, and at the same time the clamping faces 37 of the three counter cams 27 will be pressed against the workpiece 6, so that the latter is braked together with the working spindle 1. In order to release the counter cams 27 from the workpiece 6, it is necessary first of all to release the set screw 19 and then the clamping ring 16 is turned in the direction of rotation, whereupon the workpiece 6 can be removed from the centre in the manner known in connection with a lathe.

If, during the tightening of the driver, the clamping ring 16 is swung clockwise into its right-hand end position with respect to the floating ring, which is stationary at this moment, or if, during the loosening, it is swung counter clockwise into its left-hand end position, then in both cases one of the two cams 32 abuts on the lug 17, whereby the path of the clamping ring 16 is limited and the pins 21 are prevented from coming out of the slots 28 of the counter cams 27.

If, during the swinging of the floating ring 11 with respect to the fixed flange ring 8, the former were to travel too far to the left or the right, the pins 21 would be able to come out of the slots 28 of the clamping cams 27. The two stop pins 34 in the flange ring 8 and the pin 35 in the floating ring 11 serve to limit the swinging movement.

The resilient mounting of the floating ring 11 enables workpieces running slightly out of true to be satisfactorily driven.

What I claim is:

A driver for lathes, comprising, in combination with a spindle, a flange connected with said spindle, a flange ring, means securing said flange ring to said flange, said flange ring having a recess formed therein, a floating ring in said recess, a plurality of driver pins carried by said flange ring, a plurality of pivot pins carried by said floating ring, a plurality of clamping cams, a plurality of counter cams, each clamping cam being mounted on a separate pivot pin and engaging a separate driver pin, each counter cam being swingably mounted upon a separate pivot pin, the mass and the center of gravity of each clamping cam being disposed relatively to each other so that the clamping cam will be swung inwardly when the driver is rotated, resilient means connected to the flange ring supporting said floating ring for centering said floating ring relatively to the flange ring, a retaining ring rotatably mounted upon said flange ring, clamping means upon said retaining ring for axially guiding and clamping the retaining ring upon said flange ring, lugs upon said retaining ring, and a separate pin in each of said lugs, each of the last-mentioned pins engaging a separate counter cam.

References Cited in the file of this patent

FOREIGN PATENTS

| Number | Country | Date |
|--------|---------|------|
| 702,445 | Germany | Feb. 7, 1941 |